(12) United States Patent
Tanaka et al.

(10) Patent No.: US 9,548,583 B2
(45) Date of Patent: Jan. 17, 2017

(54) FIBER LASER OSCILLATOR, FIBER LASER PROCESSING DEVICE, AND FIBER LASER OSCILLATOR DEHUMIDIFICATION METHOD

(71) Applicant: AMADA COMPANY, LIMITED, Kanagawa (JP)

(72) Inventors: Keishi Tanaka, Kanagawa (JP); Hiroshi Sako, Kanagawa (JP); Asami Morino, Kanagawa (JP)

(73) Assignee: AMADA COMPANY, LIMITED, Kanagawa (JP)

( * ) Notice: Subject to any disclaimer, the term of this patent is extended or adjusted under 35 U.S.C. 154(b) by 0 days.

(21) Appl. No.: 14/391,062

(22) PCT Filed: Apr. 5, 2013

(86) PCT No.: PCT/JP2013/060477
§ 371 (c)(1),
(2) Date: Oct. 7, 2014

(87) PCT Pub. No.: WO2013/157414
PCT Pub. Date: Oct. 24, 2013

(65) Prior Publication Data
US 2015/0333467 A1 Nov. 19, 2015

(30) Foreign Application Priority Data

Apr. 16, 2012 (JP) .................... 2012-092609
Dec. 25, 2012 (JP) .................... 2012-280816

(51) Int. Cl.
*H01S 3/04* (2006.01)
*H01S 3/067* (2006.01)
(Continued)

(52) U.S. Cl.
CPC ......... *H01S 3/0407* (2013.01); *H01S 3/06704* (2013.01); *H01S 3/2383* (2013.01); *H01S 3/027* (2013.01); *H01S 3/0404* (2013.01)

(58) Field of Classification Search
CPC .... H01S 3/027; H01S 3/0407; H01S 3/06704; H01S 3/2383
See application file for complete search history.

(56) References Cited

U.S. PATENT DOCUMENTS 5,472,480 A * 12/1995 Barbe ............... B01D 53/226
                                                           95/117
5,763,855 A    6/1998 Shioji
(Continued)

FOREIGN PATENT DOCUMENTS

JP    6-106019    4/1994
JP    7-328784    12/1995
(Continued)

OTHER PUBLICATIONS

Extended European Search Report for EP Pat. App. No. 13779047.3 having an issuance date of Jan. 25, 2016.

*Primary Examiner* — Xinning Niu
(74) *Attorney, Agent, or Firm* — Greenblum & Bernstein, P.L.C.

(57) ABSTRACT

A fiber laser processing device includes: an air purge unit having a low-dew-pointizer section for changing compressed air for purging supplied from the exterior into dry air with a low dew point by means of a gas separation membrane module; a fiber laser oscillator having a combiner for combining and emitting the laser lights respectively outputted from the plurality of fiber laser modules to the exterior, and a distributor for distributing and supplying the dry air respectively to the plurality of fiber laser modules; and a laser processing machine for carrying out laser machining on a workpiece by means of the laser lights emitted from the combiner.

14 Claims, 5 Drawing Sheets

(51) Int. Cl.
*H01S 3/23* (2006.01)
*H01S 3/02* (2006.01)

(56) References Cited

U.S. PATENT DOCUMENTS

| | | | |
|---|---|---|---|
| 6,212,310 B1* | 4/2001 | Waarts | G02B 6/29319 |
| | | | 372/43.01 |
| 6,229,939 B1* | 5/2001 | Komine | B82Y 20/00 |
| | | | 372/6 |
| 6,275,250 B1* | 8/2001 | Sanders | B23K 26/032 |
| | | | 347/237 |
| 2003/0103545 A1* | 6/2003 | Julliard | B65D 81/266 |
| | | | 372/109 |
| 2004/0187452 A1* | 9/2004 | Edo | H01L 21/67017 |
| | | | 55/385.2 |
| 2008/0219317 A1* | 9/2008 | Pettit | A61F 9/008 |
| | | | 372/55 |
| 2011/0089339 A1 | 4/2011 | Yamashita et al. | |

FOREIGN PATENT DOCUMENTS

| | | |
|---|---|---|
| JP | 2004-14886 | 1/2004 |
| JP | 2004-188361 | 7/2004 |
| JP | 2008-212690 | 9/2008 |
| JP | 2012-24778 | 2/2012 |

* cited by examiner

K1: 1dm³/min(1L/min)  K4: 5dm³/min(5L/min)
K2: 2dm³/min(2L/min)  K5: 10dm³/min(10L/min)
K3: 3dm³/min(3L/min)

KC1: 1dm³/min(1L/min)　　KC4: 5dm³/min(5L/min)
KC2: 2dm³/min(2L/min)　　KC5: 10dm³/min(10L/min)
KC3: 3dm³/min(3L/min)　　KC6: IN THE CHASSIS WITH THE COOLER C

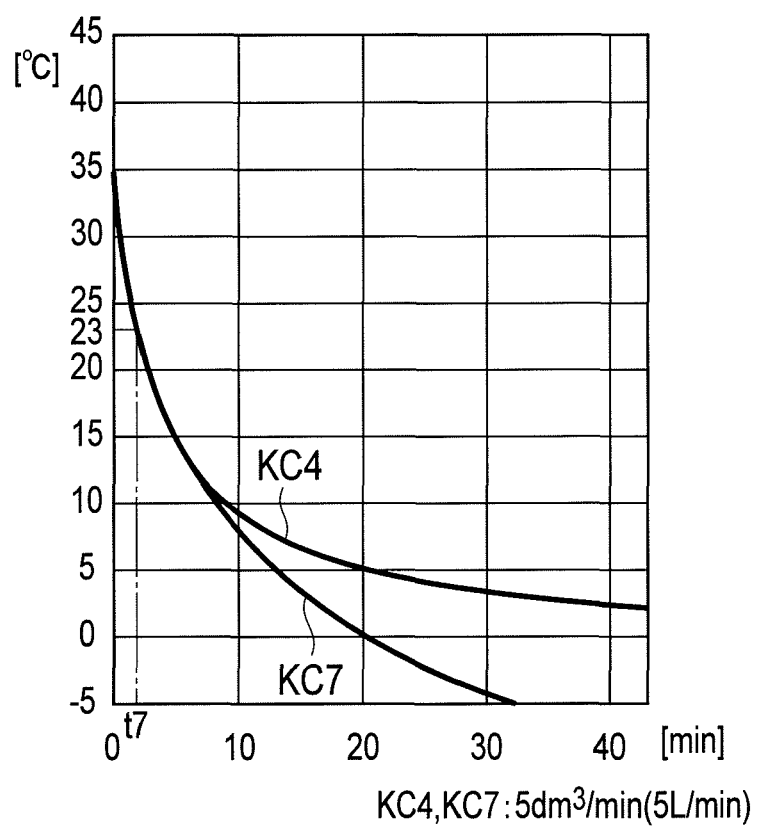

FIBER LASER OSCILLATOR, FIBER LASER PROCESSING DEVICE, AND FIBER LASER OSCILLATOR DEHUMIDIFICATION METHOD

TECHNICAL FIELD

The present invention relates to a fiber laser oscillator, a fiber laser processing device, and a dehumidification method for a fiber laser oscillator.

BACKGROUND ART

A fiber laser oscillator is constituted to have a chassis, an optical engine housed in the chassis substantially in a tightly sealed state, a control device for controlling the oscillation operation, and a cooling device. The optical engine is comprised of a plurality of fiber laser modules each having a semiconductor laser as a laser light source and a combiner for combining the laser lights respectively generated by the fiber laser modules. The laser light combined by the combiner is output to the exterior via a processed fiber.

Efficiency of laser oscillation by a semiconductor laser generally has some temperature dependency. It is thus necessary to retain a temperature of the optical engine that produces heat in accordance with laser light oscillation within a proper temperature range by cooling, so as to assure high oscillation efficiency steadily. The cooling device is provided for the purpose of proper temperature management of the optical engine. This cooling is carried out by inflow and circulation of cooling water of 24 degrees C. for instance through a coolant conduit (cooler pipe) arranged in the chassis.

In the meantime, if the quantity of water vapor contained in the air within the chassis exceeds a saturated water vapor quantity at the temperature of the cooling water (24 degrees C. for instance), condensation will occur on the surface of the cooler pipe, which gives rise to greater possibility for malfunction of electronic devices in the optical engines. It is therefore necessary to postpone injection of the cooling water into the cooler pipe until humidity of the air within the chassis and the air within the fiber laser module is sufficiently reduced by a dehumidifier device.

The Patent Literature 1 proposes a fiber laser oscillator comprised of such a dehumidifier device in a chassis, which is comprised of a dehumidifier device for supplying dried air (dry air with a low dew point) respectively to a plurality of LD modules in the chassis. In more detail, it proposes an example in which dry air with a low dew point obtained by dehumidifying is supplied at a rate of 1 L (1 $dm^3$) per minute by a small pump, while it is also described to use a device for supplying purging air, which had been also installed in laser processing devices or such, which have been used in laser processing machines.

CITATION LIST

Patent Literature

[PTL 1]: Japanese Patent Application Laid-open No. 2012-024778

DISCLOSURE OF INVENTION

In the device set forth in the patent literature 1, in a case where a small pump is used to supply dry air with a low dew point, air is supplied at a rate about 1 $dm^3$ per minute.

However, a flow rate of available dry air with a low dew point supplied thereby is inherently limited and a relatively long period is, for example, often required before dehumidifying is sufficiently carried out after starting dehumidifying by power activation or such so as to enable output of fiber laser depending on relations of temperature and humidity of air in the chassis.

On the other hand, the market desires increase in power of fiber laser processing devices and, to meet this desire, attempts to increase in power of fiber laser processing devices is under progress. And, capacity increase of cooling systems and dehumidifying systems for enabling this increase in power with some margin is also looked forward.

In this situation, it is considered effective to use compressed air that could be abundantly supplied as air for purging from the exterior, whereas the patent literature 1 does not propose any concrete construction or such for using the compressed air in dehumidifying.

A problem to be solved by the present invention is thus to provide a fiber laser oscillator, a fiber laser processing device and a dehumidifying method for a fiber laser oscillator, which use air for purging and reduce a waiting time from starting dehumidifying to enabling a machining operation by dehumidifying, thereby they are convenient.

To solve the aforementioned problem, provided is a fiber laser oscillator comprising: a plurality of fiber laser modules outputting laser lights; a combiner for combining and emitting the laser lights respectively outputted from the plurality of fiber laser modules to the exterior; a low-dew-pointizer section for changing compressed air for purging supplied from the exterior into dry air with a low dew point by means of a gas separation membrane module; and a distributor for distributing and supplying the dry air respectively to the plurality of fiber laser modules.

Further provided is a fiber laser processing device comprising: an air purge unit having a low-dew-pointizer section for changing compressed air for purging supplied from the exterior into dry air with a low dew point by means of a gas separation membrane module; a fiber laser oscillator having a combiner for combining and emitting the laser lights respectively outputted from the plurality of fiber laser modules to the exterior, and a distributor for distributing and supplying the dry air respectively to the plurality of fiber laser modules; and a laser processing machine for carrying out laser machining on a workpiece by means of the laser lights emitted from the combiner.

Furthermore provided is a dehumidifying method for a fiber laser oscillator comprising a plurality of fiber laser modules outputting laser lights and a combiner for combining and emitting the laser lights respectively outputted from the plurality of fiber laser modules to the exterior, the dehumidifying method comprising: a dry air generation step of changing compressed air for purging supplied from the exterior into dry air with a low dew point by means of a gas separation membrane module; and a dry air supply step of distributing and supplying the dry air respectively to the plurality of fiber laser modules.

BRIEF DESCRIPTION OF DRAWINGS

FIG. 7 is a graph illustrating change of a dew point by a dehumidifying operation of a fiber laser oscillator of a modified example 2 of the embodiment of the present invention.

BEST MODE FOR CARRYING OUT THE INVENTION

A fiber laser oscillator 1 and a fiber laser processing device 51 as an embodiment of the present invention will be described hereinafter with reference to FIG. 1 through FIG. 6.

Figure 1:
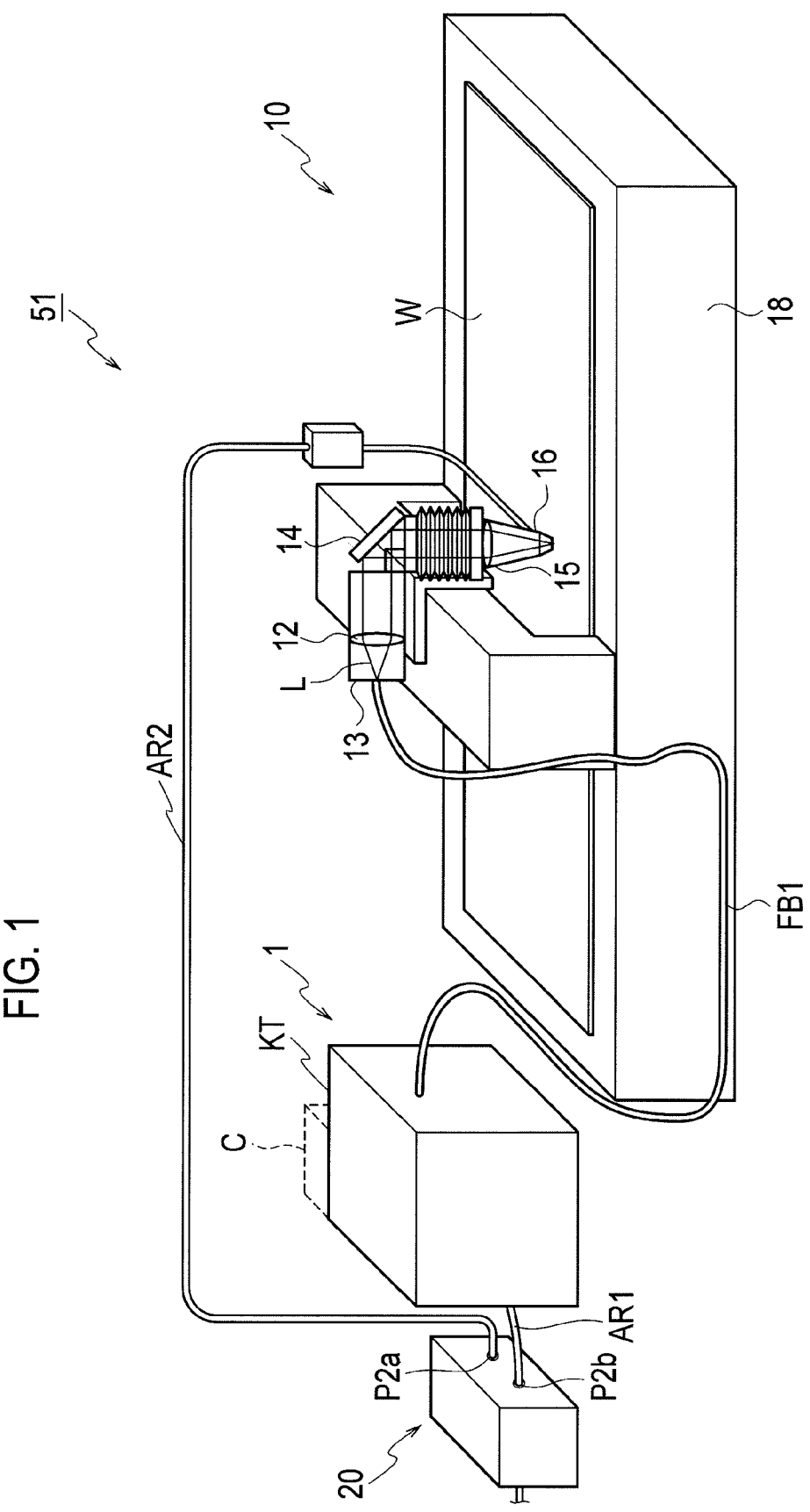
FIG. 1 is an overall view illustrating a fiber laser processing device of an embodiment of the present invention.

The fiber laser processing device 51 will be first described with reference to FIG. 1. As shown in FIG. 1, the fiber laser processing device 51 is comprised of a fiber laser processing machine 10 for carrying out laser machining on a workpiece W, a fiber laser oscillator 1 supplying laser light through a processed fiber FB1 to the fiber laser processing machine 10, and an air purge unit 20 for supplying dry air with a low dew point through an air supply path AR1 to the fiber laser oscillator 1 and through an air supply path AR2 to the fiber laser processing machine 10.

The fiber laser processing machine 10 is comprised of a collimator unit 13 for changing laser light L that exits and spreads out from an exit end face of the processed fiber FB1 into collimated light by a collimator lens 12, a bend mirror for reflecting the laser light collimated by the collimator lens 12, a laser head 16 for focusing the laser light reflected by the bend mirror 14 into laser light of a high energy density, and a processing table 18 on which the workpiece W to be processed by the focused laser light is placed. Further, the laser head 16 is so configured as to prevent adhesion of grit and dust onto the optical system as that is capable of introducing the dry air with the low dew point supplied from the air supply path AR2 into the interior.

Figure 2:
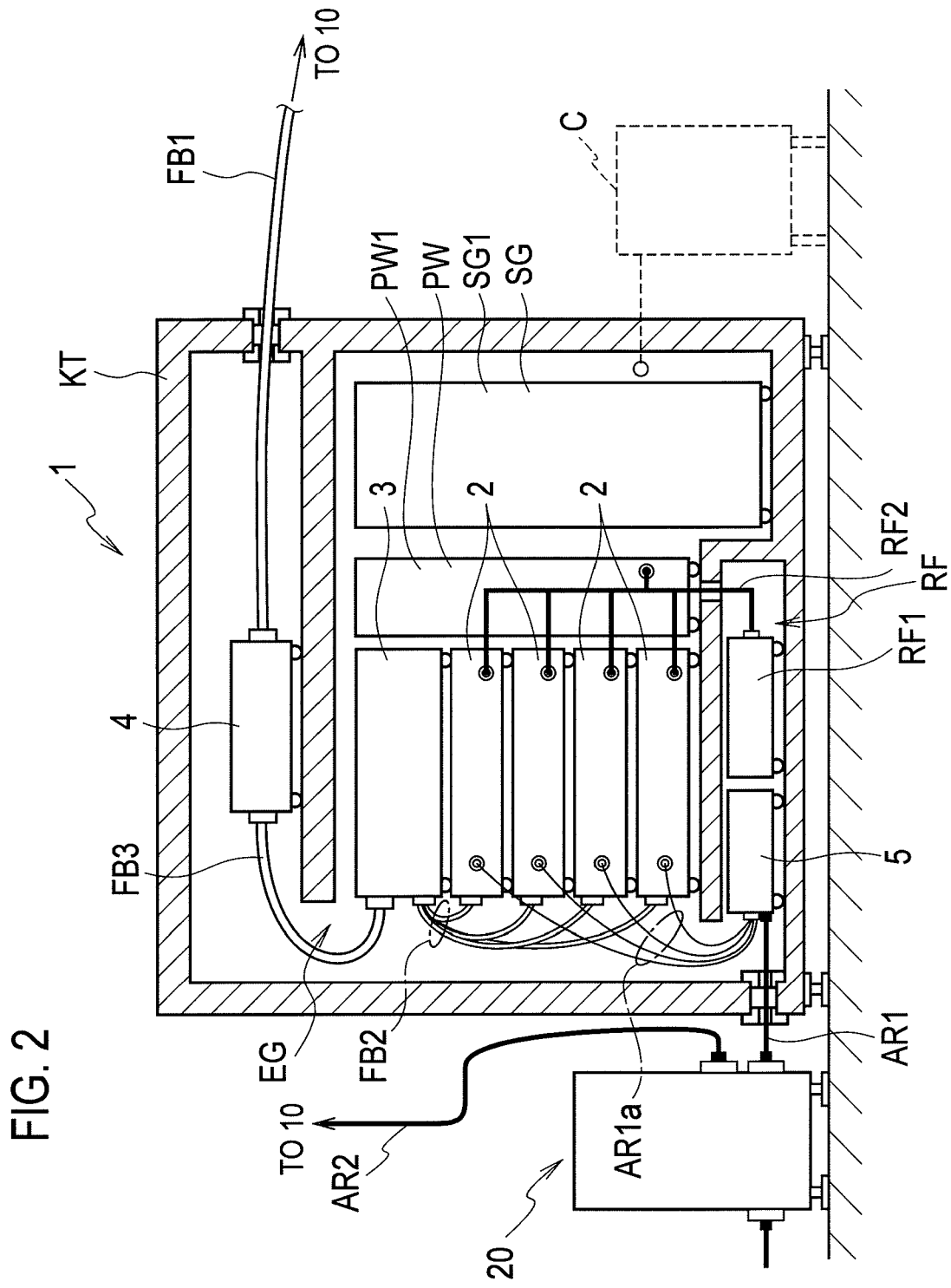
FIG. 2 is a drawing illustrating a fiber laser oscillator of the embodiment of the present invention.

The fiber laser oscillator 1 will be next described with reference to FIG. 2. In FIG. 2, the fiber laser oscillator 1 is comprised of a chassis KT, an optical engine EG housed in the chassis KT substantially in a tightly sealed state, a control section SG for controlling operation of the fiber laser oscillator 1, a power section PW, and a cooling section RF. The control section SG and the power section PW also respectively have a chassis SG1 and a chassis PW1, the interiors of which are placed in a tightly sealed state substantially.

The optical engine EG has a plurality (four in this example) of fiber laser modules 2, a plurality of unit fibers FB2 respectively transmitting the laser light generated by the respective fiber laser modules 2, and a combiner 3 fusing and bundling the plurality of unit fibers FB2 into one. Between the combiner 3 and the processed fiber FB2 provided are a feed fiber FB3 and a beam switch 4 which are connected in series, thereby the laser lights which the combiner 3 bundles into one and then outputs are output via the feed fiber FB3 and the beam switch 4 into the processed fiber FB1. The cooling section RF has a cooling water supply section RF1 and a water conduit system RF2 laid so as to run from the cooling water supply section RF1 around the interiors of the respective fiber laser modules 2 and the power section PW respectively. The cooling water supply section RF1 conducts cooling water in the water conduit system RF2 to cool the respective fiber laser modules 2 and the power section PW. Further the cooling water supply section RF1 maintains and manages the cooling water at 24 degrees C. for example.

Further in the chassis KT provided is a distributor 5 for distributing the dry air with the low dew point supplied via the air supply path AR1 from the air purge unit 20 to predetermined components and sections. More concretely, the dry air with the low dew point supplied to the distributor 5 is supplied respectively to the plurality of fiber laser modules 2 via a plurality of air sub-paths AR1a branching from the air supply path AR1.

Each fiber laser module 2 has an excitation light source by a semiconductor laser, a driver circuit, a heat sink, a resonator and such (any of them not shown) and is housed in the chassis KT. An output power of each fiber laser module 2 is about several hundred watts (350 W for example). Therefore, as the example shown in FIG. 2 is comprised of four fiber laser modules 2, in a case where the power of each fiber 2 is 350 W, the laser lights output from them are, after being bundled by the combiner 3, outputted from the processed fiber FB1 at a power of 1.4 kW.

The air purge unit 20 will be next described with reference to FIG. 3. The air purge unit 20 has an activated charcoal bath 21, an oil mist filter 22, a low-dew-pointizer section 23, and a branch section 24. The air purge unit 20 further has a supply port P1 as an input side and two feeding ports P2a,P2b as output sides.

To the supply port P1 supplied is compressed air A. The supplied compressed air A passes through the activated charcoal bath 21 and the oil mist filter 22 so that oily contents, grit and dust, oil mist, and such are removed therefrom, and thereafter passes through the low-dew-pointizer section 23.

The low-dew-pointizer section 23 has a nitrogen separation membrane module 23a as a gas separation membrane module. The nitrogen separation membrane module 23a has a function of separating nitrogen ($N_2$) and argon (Ar) from the other gas components by using speed differences through hollow fiber membranes. Its shape is made in a cylindrical shape where hollow fiber membranes are bundled, one end of the cylinder is made to be an inlet for air, and another end is an outlet for air after being processed with using the properties of the hollow fiber membranes.

When compressed air A1 that passes through the oil mist filter 22 is supplied to the interior of the nitrogen separation membrane module 23a through one end, oxygen ($O_2$), water vapor ($H_2O$), and carbon dioxide ($CO_2$), all of which are more likely to pass through the hollow fiber membranes than nitrogen ($N_2$) and argon (Ar) are, get out through the cylindrical wall (see arrows Aa) so that the air is changed into dry air A2 with reduced concentrations of oxygen and water vapor to be rich in nitrogen and with a low dew point and is then exhausted out of another end.

The dry air A2 rich in nitrogen and with the low dew point exhausted out of the low-dew-pointizer section 23 is, by the branch section 24, made to branch into two lines, which are respectively fed to the feeding ports P2a, P2b. The dry air supplied to the feeding port P2a is fed out toward the fiber laser processing machine 10 via the air supply path AR2. The dry air supplied to the feeding port P2b is fed toward the distributor 5 of the fiber laser oscillator 1 via the air supply path AR1.

The compressed air A supplied to the supply port P1 of the air purge unit 20 is compressed and generated by a compressor of the air supply source P so as to pass through a pre-filter 30 before being supplied to the air purge unit 20. At the pre-filter 30 removed are relatively large foreign objects such as oily contents, foreign objects, oil mist and water droplets.

To the low-dew-pointizer section 23 applicable is a commercially available nitrogen gas generator of a membrane separation type with a nitrogen separation membrane module 23a. In the nitrogen separation membrane module 23a used are hollow fiber membranes of polyimide for example. A nitrogen gas generator of a membrane separation type can in general generate dry air with a low dew point of −40 degrees C. or lower (lower limit may be −60 degrees C. for example) under atmospheric pressure from air of 40 degrees C. in temperature and 80% RT in humidity.

After carrying out dehumidifying work in which the dry air with the low dew point generated by the low-dew-pointizer section 23 with the aforementioned nitrogen gas generator with the membrane separation type is supplied to the interiors of the fiber laser modules 2 via the distributor 2 shown in FIG. 2, time change in a dew point of the air in the fiber modules 2 was measured.

Here the spatial capacity of the interiors of the fiber modules 2 was about 25 $dm^3$ and the circumferential atmosphere around the fiber laser modules 2 was 40 degrees C. in temperature and 80% RH in humidity just before the humidifying work. Further, the temperature of the cooling water supplied by the cooling section RF was 24±1 degrees C. Further, to the low-dew-pointizer 23 applied was one with a capacity by which dry air with a low dew point of −40 degrees C. under atmosphere can be generated from the air of 40 degrees C. in temperature and 80% RH in humidity.

Feeding rates of the dry air with the low dew point were measured in five steps from 1 $dm^3$/min corresponding to the prior art to 10 $dm^3$/min that the air purge unit 20 can supply. Results are shown in FIG. 4.

Figure 4:
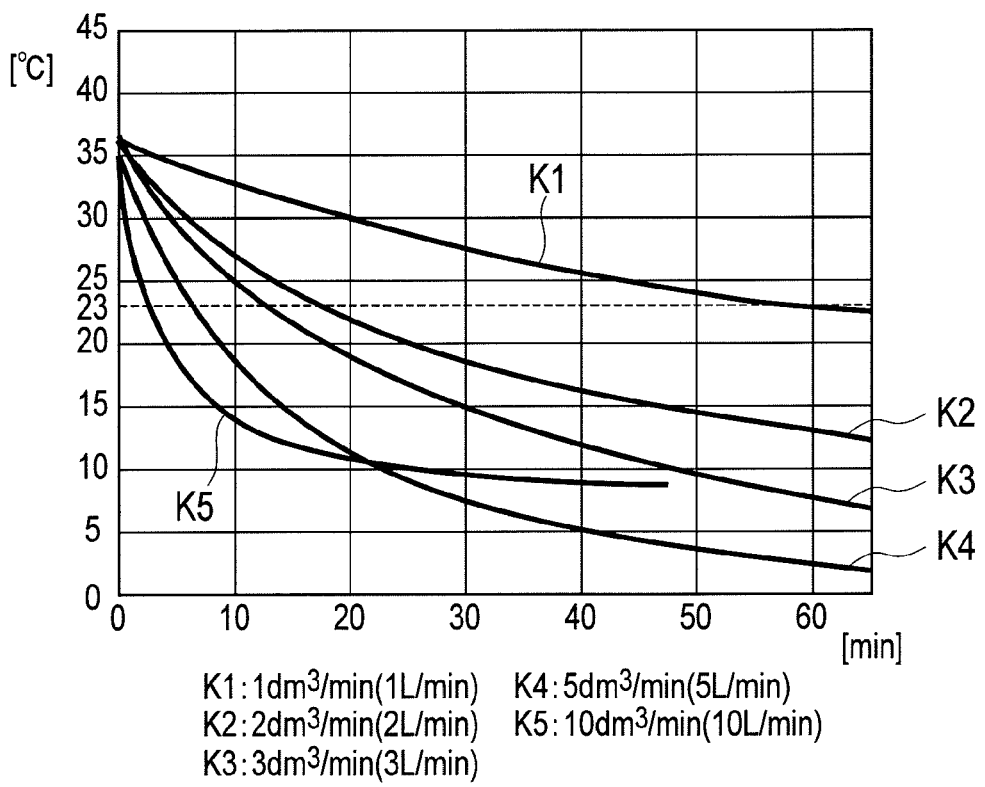
FIG. 4 is a graph illustrating change of a dew point by dehumidifying a fiber laser oscillator of the embodiment of the present invention.

In FIG. 4, when the dew point is lower than 23 degrees C. that is a lower limit temperature of the cooling water, the amount of water vapor in the air in the fiber laser modules will not exceed the saturated water vapor amount and therefore dew does not form.

Thus each time t (referred to as a dehumidifying time t hereinafter) from a start of supplying dry air with a low dew point generated from the compressed air A1 to when the dew point is lower than 23 degrees C. was estimated at each process K1-K5 where the feeding rate of dry air with a low dew point differs from each other.

The following results were obtained as dehumidifying times t at respective processes.

Figure 5:
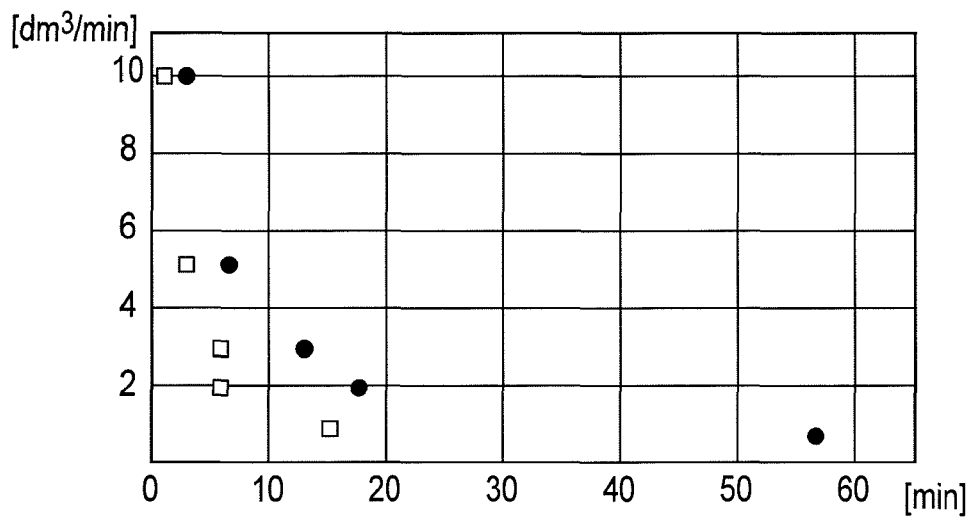
FIG. 5 is another graph illustrating change of a dew point by a dehumidifying operation of a fiber laser oscillator of the embodiment of the present invention.

Process K1 (1 $dm^3$/min): 57 min. 30 sec (3450 sec),
Process K2 (2 $dm^3$/min): 17 min. 40 sec (1060 sec),
Process K3 (3 $dm^3$/min): 12 min. 46 sec (766 sec),
Process K4 (5 $dm^3$/min): 6 min. 05 sec (365 sec),
Process K5 (10 $dm^3$/min): 2 min. 35 sec (155 sec),
These results are plotted with filled circles in FIG. 5.

The feeding rate in the process K1 is within a level of the prior art using a small pump without using compressed air for purging. When comparing the process K1 with the process K5 in which the compressed air supplied as air for purging is used, the humidifying time t at the fiber laser oscillator 1 when the compressed air is used is shortened from 3450 sec to 155 sec, namely down to about 4.5% (about 1/22).

As the humidifying time t is a time from power activation by a user until the laser lights are outputted for example, the fiber laser oscillator 1 has a considerably reduced waiting time until operation is enabled and is thus very convenient.

According to the construction as described above, even in a case where a door (not shown) of the chassis KT is opened for the purpose of maintenance of the fiber laser oscillator 1, the dry air with the low dew point is directly supplied to the interiors of the fiber laser modules 2 and the power section PW, thereby the dew point of the air in the respective interiors will not be drastically elevated.

The fiber laser processing device 51 conducts compressed air for purging, which was to date supplied to processing machines set up in works, after foreign objects removal by a filter, through a nitrogen gas generator of a membrane separation type for example, which uses nitrogen separation membrane modules as gas separation membrane modules so as to dehumidify it. Thereafter the dry air with the low dew point obtained by dehumidifying branches into a plurality of supply paths and the dry air with the low dew point is supplied via one of the branching supply paths to the fiber laser oscillator 1 and further supplied via another of the branching supply paths to the fiber laser processing machine 10. Thereafter by supplying the dry air with the low dew point supplied to the fiber laser oscillator 1 respectively to the plurality of fiber laser modules by means of the distributor 5, the interiors of the fiber laser modules 2 are dehumidified and the air therein is made to be low-dew-pointized.

According to this dehumidifying method, the large amount of the dry air with the low dew point can be supplied to the interiors of the fiber laser modules 2 and the waiting time from starting the dehumidifying operation to when output of the laser lights is enabled is short, thereby making the fiber laser processing device be very convenient.

The aforementioned dehumidifying operation is controlled by the control section SG. It is possible that a valve for regulating a feeding rate of the dry air with the low dew point per unit time so as to save electric power in a range where the dew point is elevated to form condensation is provided on the supply paths for the dry air with the low dew point and throttle positions of the valves are regulated by the control section SG. Or, it is possible that flow switches are provided on supply paths of the dry air with the low dew point to watch flow rates and malfunction is notified by any alarm when the flow rates fall below any predetermined value.

The embodiment of the present invention is not limited to what is described above. It is needless to say that the invention could be modified into any modified examples that do not go beyond the gist of the invention.

Modified Example 1

In regard to the dehumidifying operation, in parallel with the dehumidifying operation by supplying the dry air with the low dew point to the fiber laser modules 2 and the power section PW, a dehumidifying operation about the air in the chassis KT by a cooler C may be carried out. In this case, the cooler C is installed in the chassis KT as shown in FIG. 1 and FIG. 2 by broken lines. These dehumidifying operations are controlled by the control section SG.

Figure 6:
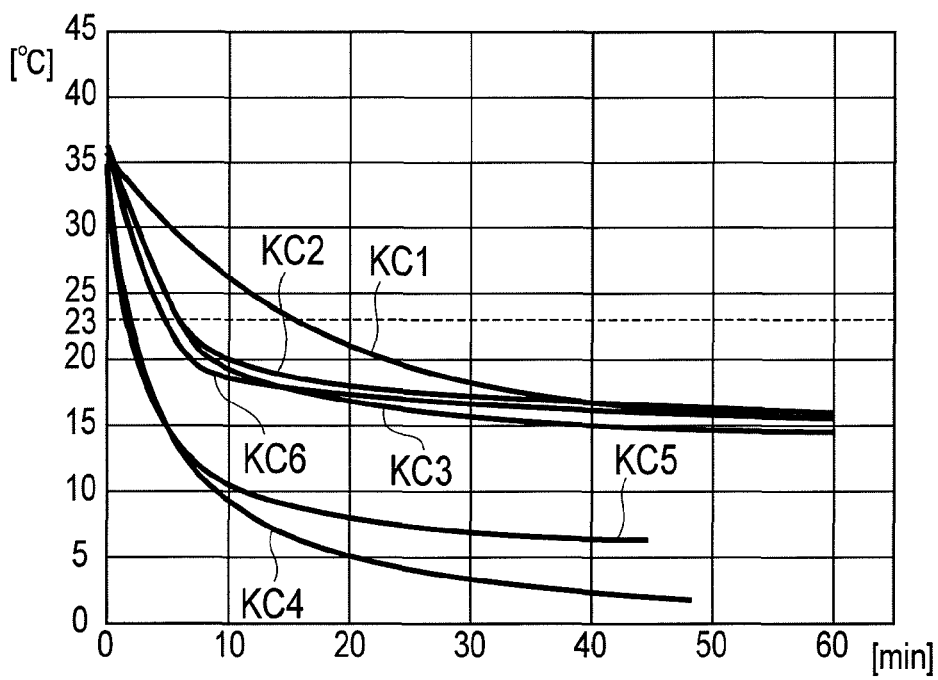
FIG. 6 is a graph illustrating change of a dew point by a dehumidifying operation of a fiber laser oscillator of a modified example 1 of the embodiment of the present invention.

FIG. 6 is a graph showing time change of dew points of air in the fiber laser modules 2 in a case where dehumidifying only by supplying the dry air with the low dew point is carried out and as well dehumidifying of the air in the chassis KT is carried out by the cooler C in parallel.

The dehumidifying times t in processes KC1-5 in this case are shown below.

Process KC1 (1 dm$^3$/min): 15 min. 10 sec (910 sec),
Process KC2 (2 dm$^3$/min): 5 min. 50 sec (350 sec),
Process KC3 (3 dm$^3$/min): 5 min. 55 sec (355 sec),
Process KC4 (5 dm$^3$/min): 2 min. 5 sec (125 sec),
Process KC5 (10 dm$^3$/min): 1 min. 45 sec (105 sec), These results are plotted with open circles in FIG. 5.

Further, in the test of the process KC3, the change of the dew point of the air at the interior of the chassis KT and at the exterior of the fiber laser modules 2 and the power section PW is measured and shown as the process KC6 in FIG. 6. The dehumidifying time t in the process KC6 (namely, the dehumidifying time of the air in the chassis KT) is: Process KC6 (in the chassis): 6 min. 3 sec (183 sec).

As being apparent from FIG. 6, in the dehumidifying operation of the fiber laser modules 2 and the power section PW; to dehumidify the air in the chassis KT in parallel is preferable because the dehumidifying time t is shortened about by half and the waiting time before enabling the operation of the fiber laser oscillator 1 is further shortened, thereby being convenient.

Modified Example 2

Instead of the nitrogen gas generator of the membrane separation type as the low-dew-pointizer section 23 of the air purge unit 20 in the fiber laser device 51, an air dryer of a membrane type may be used. The air dryer of the membrane type is to use moisture transmission membrane modules 23b (see FIG. 3) in which hollow fiber membranes of porous fluorides or such having moisture permeability are bundled and made into a cylindrical shape as the gas separation membrane modules to dehumidify supplied compressed air by the moisture transmission membrane modules 23b to generate dry air.

Figure 3:
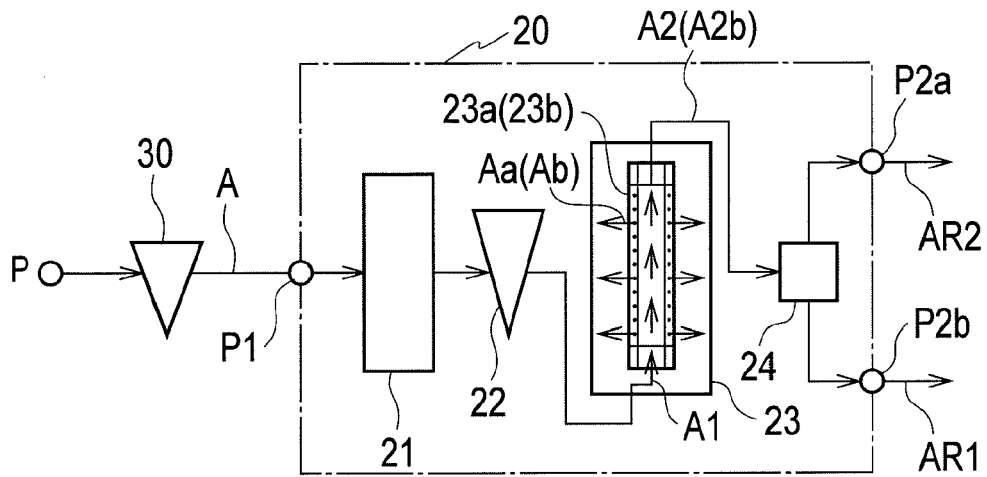
FIG. 3 is a drawing illustrating an air purge unit of the fiber laser processing device of the embodiment of the present invention.

Explaining concretely with reference to FIG. 3, when compressed air A1 that passes through the oil mist filter 22 is supplied through one end of the moisture transmission membrane modules 23b into the interior, water vapor (H$_2$O) in the compressed air A1, driven by water vapor partial pressure difference, permeates into the membranes and then gets out through the cylindrical wall (see arrows Ab), so that the air is changed into a dry air A2b from which only moisture is removed and then exhausted out through another end. This exhausted dry air A2b is fed toward the distributor 5 of the fiber laser oscillator 1.

The air dryer of the membrane type comprising the moisture transmission membrane modules 23b as the gas separation membrane modules was used to carry out the humidifying operation and time change of the dew point of the air in the fiber laser module 2 was measured. Results are shown in FIG. 7. This time change of the dew point is shown as the process KC7 in FIG. 7.

Here the feeding rate of the dry air is 5 dm$^3$/min and this dehumidifying operation is carried out in parallel with dehumidifying the interior of the chassis KT by the cooler C. In the dehumidifying operation, conditions are thus the same aside from use of the air dryer of the membrane type, and the process KC7 is a process data comparable with the process KC4 shown in FIG. 6. Thus, for facilitating comprehension, the process KC4 is plotted again in FIG. 7.

As shown in FIG. 7, the dehumidifying time t7 until the dew point gets lower than 23 degrees C. in the process KC7 was 1 min. 53 sec (113 sec). This is a result that could be estimated as being substantially equal to 2 min. 5 sec (125 sec) in the process KC4. The air dryer of the membrane type using the moisture transmission membrane modules 23b has a sufficient capacity in dehumidifying and is verified to exhibit the same effects as the case where the nitrogen separation membrane modules 23a are used.

Because the air dryer of the membrane type is small and light-weight, and is easy for installation, it is preferable for assembly into components such as the air purge unit 20. Further it does not require a power source, handling thereof is easy. It is needless to say that dehumidifying the interior of the chassis KT by the cooler C in parallel is unnecessary in the dehumidifying operation with using the air dryer of the membrane type.

Another Modified Example

To the fiber laser processing device 10, the compressed air branching at the upstream side of the air purge unit 20 may be supplied. As the dry air with the low dew point through the air purge unit 20 is, however, clean air from which oil mist and relatively large grit and dust are removed, it is preferable that the air branching at the downstream of the air purge unit 20 as described above is supplied. Further, even in a case where the compressed air branching at the upstream of the air purge unit 20, it is necessary to remove oil mist, grit and dust from the supplied compressed air so as not to damage optical functions of optical components.

In the meantime, the laser processing machine is that either for use of cutting the workpiece W or for welding, or any other use. Any limitation is given to types of processing.

Further, the air purge unit 20 may be unitarily housed in the fiber laser oscillator 1. In this case, the upstream side of the air supply paths AR2, the downstream side of which is connected to the fiber laser processing machine 10, is connected to the fiber laser oscillator 1.

INDUSTRIAL APPLICABILITY

As being apparent from the aforementioned description, by the present invention given are effects in that the waiting time from start of dehumidifying to when the processing operation is enabled is short and usage is convenient.

What is claimed is:

1. A fiber laser oscillator comprising:
a plurality of fiber laser modules configured to generate and output laser lights;
a combiner configured to combine and emit the laser lights respectively outputted from the plurality of fiber laser modules to a fiber laser processing machine disposed at an exterior of the fiber laser oscillator;
a low-dew-pointizer section that changes compressed air supplied from the exterior into dry air via a gas separation membrane module; and
a distributor for distributing and supplying the dry air respectively to the plurality of fiber laser modules, wherein
a first air supply path supplies the dry air from the low-dew-pointizer section to the distributor to purge the plurality of fiber laser modules and reduce condensation formation on the plurality of fiber laser modules as the plurality of fiber laser modules generate and output the laser lights, and
a second air supply path supplies the dry air from the low-dew pointizer section to the fiber laser processing machine to prevent adhesion of grit and dust on a laser head of the fiber laser processing machine.

2. The fiber laser oscillator of claim 1, further comprising:
a chassis for housing the plurality of fiber laser modules; and
a cooler for dehumidifying a space in the chassis.

3. The fiber laser oscillator of claim 1, wherein a dew point, under atmospheric pressure, of the dry air is −40 degrees C. or lower.

4. A fiber laser processing device comprising:
an air purge unit having a low-dew-pointizer section that changes compressed air supplied from an exterior of the fiber laser processing device into dry air via a gas separation membrane module;
a fiber laser oscillator having a combiner configured to combine and emit laser lights respectively generated and outputted from a plurality of fiber laser modules to an exterior of the fiber laser oscillator, and a distributor for distributing and supplying the dry air respectively to the plurality of fiber laser modules; and
a laser processing machine configured to laser machine a workpiece via the laser lights emitted from the combiner, wherein
a first air supply path supplies the dry air from the low-dew-pointizer section to the distributor to purge the plurality of fiber laser modules and reduce condensation formation on the plurality of fiber laser modules as the plurality of fiber laser modules generate and output the laser lights, and
a second air supply path supplies the dry air from the low-dew pointizer section to the fiber laser processing machine to prevent adhesion of grit and dust on a laser head of the fiber laser processing machine.

5. The fiber laser processing device of claim 4, further comprising:
a chassis for housing the plurality of fiber laser modules; and
a cooler for dehumidifying a space in the chassis.

6. The fiber laser processing device of claim 4, wherein a dew point, under atmospheric pressure, of the dry air is −40 degrees C. or lower.

7. A dehumidifying method for a fiber laser oscillator comprising a plurality of fiber laser modules generating and outputting laser lights and a combiner for combining and emitting the laser lights respectively outputted from the plurality of fiber laser modules to a fiber laser processing machine disposed at an exterior of the fiber laser oscillator, the dehumidifying method comprising:
changing compressed air supplied from the exterior into dry air via a gas separation membrane module;
supplying the dry air from the gas separation membrane module to a distributor via a first air supply path;
distributing the dry air from the distributor respectively to the plurality of fiber laser modules to reduce condensation formation on the plurality of fiber laser modules as the plurality of fiber laser modules generate and output the laser lights; and
supplying the dry air from the from the gas separation membrane module to the fiber laser processing machine via a second air supply path to prevent adhesion of grit and dust on a laser head of the fiber laser processing machine.

8. The dehumidifying method for the fiber laser oscillator of claim 7, wherein the fiber laser oscillator further comprises a chassis for housing the plurality of fiber laser modules and a cooler for dehumidifying a space in the chassis, and
in parallel execution with the changing of the compressed air into dry air, dehumidifying a space in the chassis.

9. The dehumidifying method for the fiber laser oscillator of claim 7, wherein a dew point, under atmospheric pressure, of the dry air is −40 degrees C. or lower.

10. The fiber laser oscillator of claim 2, wherein a dew point, under atmospheric pressure, of the dry air is −40 degrees C. or lower.

11. The fiber laser processing device of claim 5, wherein a dew point, under atmospheric pressure, of the dry air is −40 degrees C. or lower.

12. The dehumidifying method for the fiber laser oscillator of claim 8, wherein a dew point, under atmospheric pressure, of the dry air is −40 degrees C. or lower.

13. The fiber laser oscillator of claim 1, further comprising a cooler configured to supply a cooling fluid to each of the plurality of fiber laser modules to cool each of the respective fiber laser modules.

14. The fiber laser oscillator of claim 13, wherein a dew point of the dry air is lower than a lower limit temperature of the cooling fluid supplied to each of the plurality of fiber laser modules.

* * * * *

UNITED STATES PATENT AND TRADEMARK OFFICE
CERTIFICATE OF CORRECTION

PATENT NO.        : 9,548,583 B2                                    Page 1 of 1
APPLICATION NO.   : 14/391062
DATED             : January 17, 2017
INVENTOR(S)       : Tanaka et al.

It is certified that error appears in the above-identified patent and that said Letters Patent is hereby corrected as shown below:

In the Claims

Column 8, Line 65 (Claim 1) please change "low-dew pointizer" to -- low-dew-pointizer --
    Column 9, Line 29 (Claim 4) please change "low-dew pointizer" to -- low-dew-pointizer --
    Column 10, Line 12 (Claim 7) please change "from the from the gas" to -- from the gas --

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*